United States Patent Office 3,459,062
Patented Aug. 5, 1969

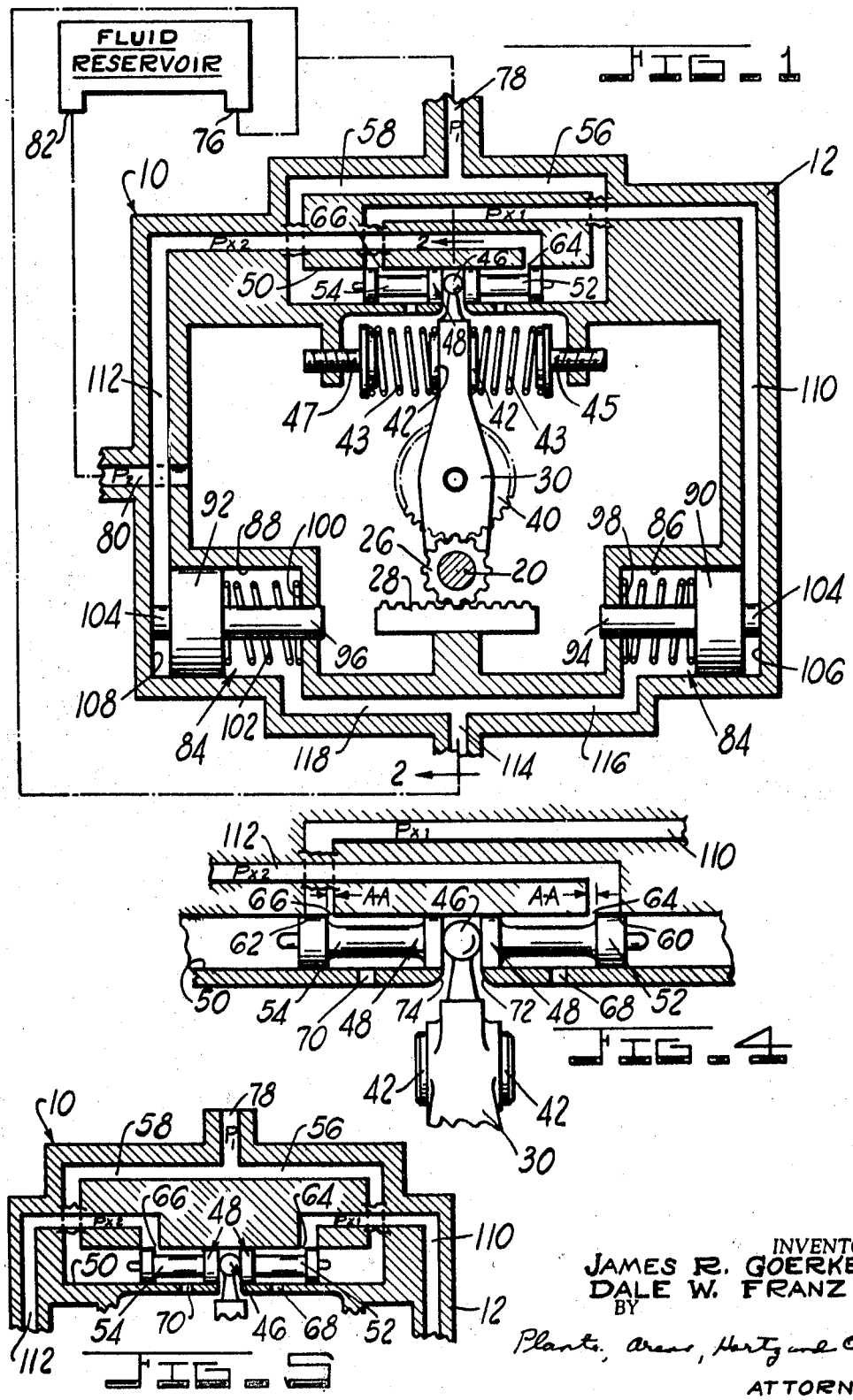

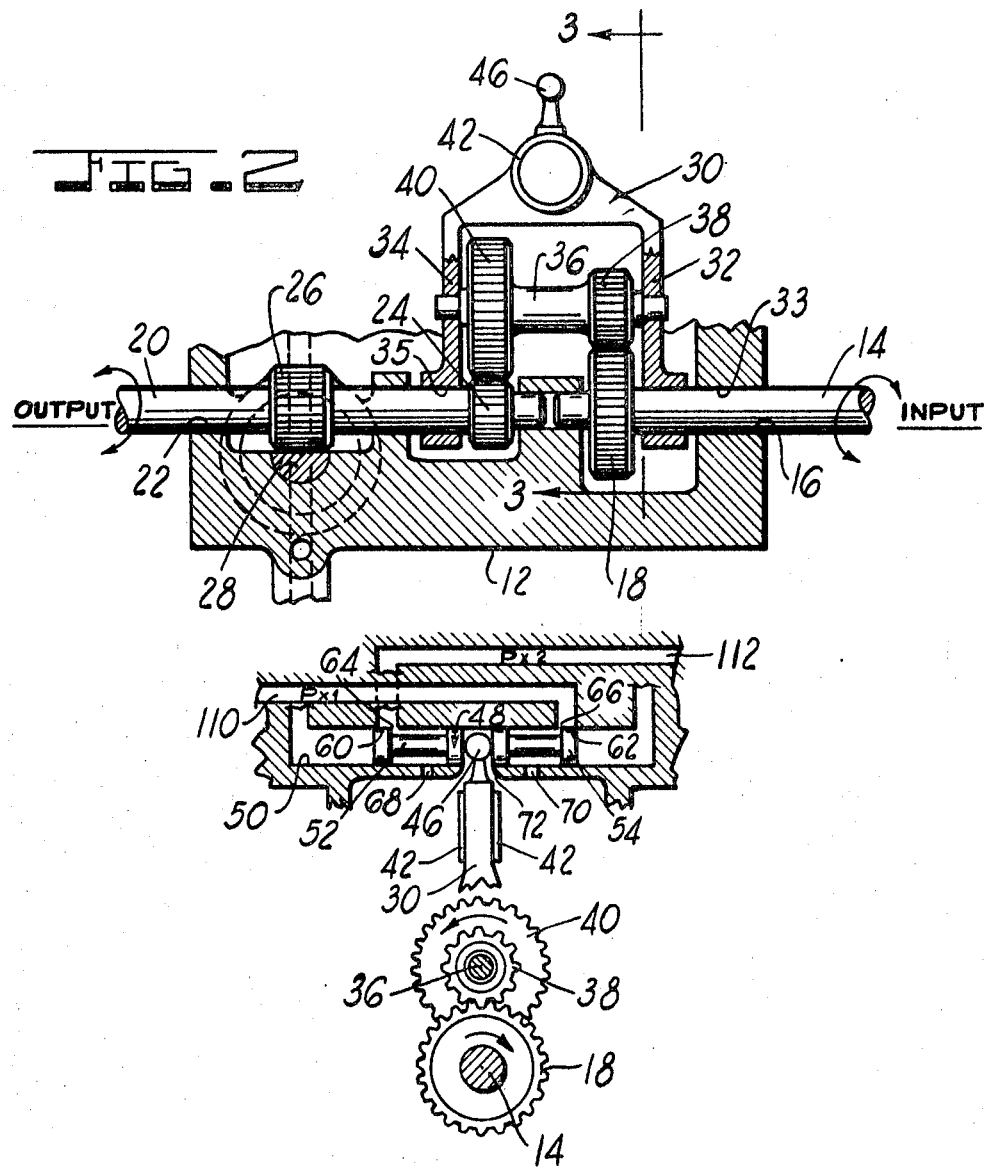

3,459,062
POWER BOOST MECHANISM
James R. Goerke and Dale W. Franz, South Bend, Ind., assignors to The Bendix Corporation, a corporation of Delaware
Filed Feb. 16, 1968, Ser. No. 706,011
Int. Cl. F16h 35/00; F15b 13/16
U.S. Cl. 74—388                                             8 Claims

ABSTRACT OF THE DISCLOSURE

A power boost mechanism having transmission of input torque to output torque by means of auxiliary gearing, said gearing mounted in a freely mounted housing, which housing is caused to rotate by the applied torque. The rotation is restrained within limits by opposing springs, when the limits are surpassed, the rotation of the housing causes a power assist system to aid the output shaft, thus providing a power boost when the torque levels reach a certain point.

Background of the invention

The present invention concerns an improvement to power boost mechanisms of the variety generally used with gas turbine engines for effective operation of a plurality of fuel control functions. However, it is felt that the invention may be used for any application where power assist is required.

The power boost mechanisms in general use today consist mainly of rather large, heavy and costly hydromechanical devices. These mechanisms have become quite sophisticated in their design and to that extent have become prone to far too many in-service problems and failures. Specifically, these devices are troublesome to align and calibrate at the time of installation in terms of mechanical friction efficiency without power assist. More importantly, should fluid power assist be lost during flight, system frictional losses are high and thus manual operation of the controls is difficult at best. Further, the accuracy of the existing devices leaves a great deal to be desired. The compilation of problems with the available devices has resulted in unreliable and thus hazardous aircraft flights.

Summary of the invention

It is the purpose of this invention to provide a power boost mechanism whose size, weight, and packaging configuration are compatible with current gas turbine engine requirements. The operation of this device will remain efficient with or without the assistance of power boost. Additionally, this invention will provide the desired accuracy and perform reliably in its operational environment.

Other objects and features of the invention will be apparent from the following description of the power boost mechanism taken in connection with the accompanying drawings.

Brief description of the drawings

FIGURE 1 is a sectional schematic of the components comprising the power boost mechanism, FIGURE 2 is a partial section view taken along line 2—2 of FIGURE 1, illustrating the input-output carriage relationship, FIGURE 3 is a partial section view taken along line 3—3 of FIGURE 2, to illustrate movement of the gears and carriage relative to an input, FIGURE 4 is an enlarged section view of the servo valve of FIGURE 1, and FIGURE 5 is an alternate connection of the servo valve of FIGURE 1.

Description of the preferred embodiment

Referring now to the drawings, the power boost mechanism 10 is of the control device variety generally used in association with a gas turbine engine (not shown). Space or function requirements usually require the power boost mechanism to be physically mounted on the engine or within a reasonably close proximity thereto.

A housing 12 receives a bi-directional rotational input shaft 14 through an opening 16. Said shaft 14 has attached thereto a gear 18 near one end which end is contained by the housing 12. It will be understood by those skilled in the art that conventional seals may be employed to provide for the required fluid pressure seals of this device. Further, it is obvious to those skilled in the art that the housing 12 of this invention may be fabricated of two or more sections to facilitate assembly and disassembly of the components therein.

The housing 12 receives an output shaft 20 through an opening 22. Said shaft 20 has attached thereto a gear 24 near its other end which end is contained by the housing 12. Intermediate said opening 22 and said gear 24 is attached to said shaft 20 a gear 26 which operatively engages a rack 28 slidingly retained in the housing 12. A carriage 30 has arms 32 and 34 which are bored as at 33 and 35 to receive input and output shaft 14 and 20, respectively, which rotatably support said carriage. Disposed between arms 32 and 34 is a shaft 36, free to rotate in said arms and having attached at one end gear 38 and at the other end gear 40. Gear 38 engages the input gear 18 and gear 40 engages the output gear 24, for transmitting force from the input to the output. The operative gear connection of the output to the input by the carriage 30 provides for a mechanical relationship therebetween; whereby, for a given input, the output shaft 20 may rotate through a smaller or larger arc than the input shaft 14 depending upon the selection of gear ratios. FIGURE 1 shows structure whereby the output shaft 20 will rotate through a larger arc than will the input shaft 14 in response to a given input. Assuming the input to output gear ratio of FIGURE 1 is reversed, FIGURE 5 shows how the structure of FIGURE 1 can be further altered to allow the output shaft 20 to rotate through a smaller arc than will the input shaft 14 in response to a given input thereby providing an inverse mechanical relationship in comparison to FIGURE 1.

The carriage 30 has a spring retainer 42 on each side thereof, as shown best in FIGURE 1, to receive axially aligned springs 43 which are retained at their remote ends by seat members 45 and 47 which are adjustably carried by the housing 12. The springs 43 are thus arranged in a force-opposing relationship with the carriage 30 interposed therebetween. Said springs 43 are responsive to a predetermined force relationship between the output and input. When the springs 43 are overcome by said predetermined force, the carriage 30 will rotate relative to the input and output shafts 14 and 30 depending upon the relative direction of force transmitted by the input gear 18 through gear 38 and shaft 36 to the carriage 30 as shown in FIGURE 3 and explained in detail hereinafter.

The carriage 30 has, as an integral part thereof, a stem 46 which operatively connects said carriage 30 to a double acting servo valve 48 comprising cylindrical cavity 50, valves 52 and 54, fluid passages 56 and 58, lands 60 and 62, ports 64 and 66, and fluid passages 68 and 70, for transmitting thereto carriage 30 rotational movement as shown in FIGURE 1. The housing 12 has stops 72 and 74 against which said stem 46 abuts to limit the bi-directional rotational movement of carriage 30 when said carriage 30 overcomes the preload force of the springs 43, as can best be seen in FIGURE 4.

The housing 12 has therein the cylindrical cavity 50 having slidably disposed therein two valves 52 and 54. The housing 12 receives fluid supply 76, at a controlled fluid pressure $P_1$, through fluid inlet 78. Fluid pressure $P_1$ communicates through fluid passages 56 and 58 against the ends of valves 52 and 54, respectively, to maintain piston engagement with said stem 46 of carriage 30. The valve 52 has a land 60 and piston 54 has a land 62. The cavity 50 has ports 64 and 66 cooperating with piston land 60 and 62, respectively. The port 66 vents controllable fluid pressure $P_{x1}$ and port 64 vents controllable fluid pressure $P_{x2}$. The servo valve 48 has a null position during which the ports 64 and 66 are vented through fluid passages 68 and 70, respectively, to the inside of the housing 12 and through fluid passage 80 to the fluid return 82 which is identified as fluid pressure $P_2$. When the input is not experiencing a change in rotational position, the device is in said null condition and the servo valve 48 is inoperative. During a null condition the servo valve 48 land to port displacement for both valve 52 and 54 is distance AA, as can best be seen in FIGURE 4. The valves 52 and 54 must move a distance slightly more than AA before any power assist is initiated. Thus, a nominal input error is required to obtain power assist. This error, however, is negligible relative to the overall accuracy of this invention. It is the function of the servo valve 48 to maintain control of fluid pressures $P_{x1}$ and $P_{x2}$. When power assist is required the servo valve 48 will provide controllable fluid pressures $P_{x1}$ or $P_{x2}$ depending upon the direction of rotation of the carriage 30. The controllable fluid pressures $P_{x1}$ and $P_{x2}$ are substantially equal to $P_1$ when port 64 or 66 is open to vent supply pressure $P_1$ therethrough. Fluid pressure $P_1$ is a substantially constant controlled pressure. Further, although not previously mentioned, it will be understood by those skilled in the art that the fluid used for this invention should be noncompressible.

A fluid-pressure-operated means 84 is inoperative when power boost is not required. The fluid-pressure-operated means 84 includes chambers 86 and 88 which receive pistons 90 and 92, respectively. Said pistons 90 and 92 have rods 94 and 96, respectively, for engagement with the rack 28. Said chambers 86 and 88 have inner walls 98 and 100, respectively. A spring means 102 of a predetermined force is interposed between inner wall 98 and piston 90, and between inner wall 100 and piston 92 for imposing a preload thereagainst tending to urge the pistons away from the rack 28. The springs 102 are provided to keep the respective piston rods 94 and 96 away from the rack 28 to preclude unnecessary mechanical friction during any period of time when the device must be operated and fluid pressure is not available or in use. A stop means 104 is attached to each of the pistons 90 and 92 to engage with outer walls 106 and 108 of said chambers 86 and 88, respectively, to limit the movement of the pistons 90 and 92 in response to the spring means 102. Chamber 86 receives controllable fluid pressure $P_{x1}$ through fluid passage 110 to energize piston 90 thereby engaging the piston rod 94 with the rack 28 to thus rotate gear 26. Chamber 88 receives controllable fluid pressure $P_{x2}$ through fluid passage 112 to energize piston 92 thereby engaging the piston rod 96 with the rack 28 to thus rotate gear 26. One or the other of said chambers 86 and 88 will be pressurized with its associated controllable fluid pressure depending upon the direction of movement of said servo valve. The housing 12 further receives fluid supply 76, at a fluid pressure $P_1$, through fluid inlet 114. Fluid pressure $P_1$, communicates through fluid passages 116 and 118 acts against pistons 90 and 92, respectively, to aid springs 102 in urging said pistons away from the rack 28.

During the installation of a control system (including a power boost mechanism as disclosed herein) in an aircraft, it is necessary to verify that for a given input position the output is responding thereto accurately. This procedure is frequently called "dry rigging" and is accomplished with the engine and other aircraft power off; thus, no fluid source pressure is available to provide power boost. In the existing devices with which I am familiar, frictional forces contribute substantial errors to this procedure. However, it is noted that in this invention the pistons 90 and 92 are retracted from the rack 28 by springs 102 anytime fluid pressure is off. This eliminates frictional forces associated with power boost operation and any errors resulting therefrom during the installation accuracy checks.

Mode of operation of the preferred embodiment

During normal in-flight aircraft maneuvers it is the accepted practice to provide the pilot with full-time power assist for his controls to prevent, as far as is possible, pilot fatigue. Equally as important is the requirement for the pilot to be able to operate the control upon partial or complete loss of fluid power assist.

It is anticipated that the power boost mechanism described herein will be operative during control setting changes of major proportion and inoperative during minor trimming of the controls.

The design of the aircraft is such that the requirements for the availability of output torque from the power boost mechanism are matched with what an operator can reasonably be expected to exert in the way of force on the input control. However, the predetermined level at which power boost assists the operator is below that which the operator normally would have to exert on the input to cause a response from the output.

Assuming that a minor trimming of the controls is desired: the input shaft 14 is rotated nominally in either direction; thus, gear 18 will turn in the same direction as the input shaft 14 while gear 38, shaft 36 and gear 40 will turn in the opposite direction causing gear 24 to turn in the same direction as the input shaft 14. Since the torque required to control the mechanisms operatively connected to the output does not in this case exceed the predetermined level at which power boost becomes operative, the output shaft 20 is free to and will follow the rotation of the input shaft 14.

Assuming that a control setting change of major proportions is desired: the input shaft 14 is rotated in either direction such that gear 18 will turn in the same direction as the input shaft 14 while gear 38, shaft 36 and gear 40 will turn in the opposite direction tending to cause gear 24 and output shaft 20 to turn in the same direction as gear 18. However, the torque required to move the mechanism operatively connected to the output shaft 20 exceeds the torque being applied to the input shaft 14 as magnified by the mechanical advantage of the device, as well as said predetermined level established by springs 43. Thus, the output shaft 20 and gear 24 will not turn and the carriage 30 will rotate and cause the stem 46 to deflect servo valve 48 in one direction or the other depending upon the direction of rotation of the input shaft 14.

Assuming further that the input rotation is clockwise looking from the external end of the input shaft: FIGURE 3 then shows the direction in which gears 18, 38, and 40 will turn and the direction in which carriage 30 will rotate relative to the input and output shafts 14 and 20, respectively, to which said carriage 30 is attached.

This clockwise rotation of the carriage 30 will slide valve 54 and allow fluid pressure $P_1$ to slide valve 52 toward the carriage stem 46 thus communicating fluid pressure $P_1$ through port 64 and fluid passage 112 to exert a force against the end of piston 92. Piston 92 will engage rack 28 and cause gear 26 and output shaft 20 to move in a clockwise direction (as viewed from the input) until the torque required by said input to rotate the output shaft 20, again drops below the predetermined level of the springs 43, at which time the power boost will become inoperative.

It is understood that a counter-clockwise input rotation looking at the input shaft 14, as depicted in FIGURE 3, will result in an identical converse action in providing power assist to the output shaft 20.

It is further understood that if the output shaft 20 is to rotate through a smaller arc than the input shaft 14 in response to a given input, the input to output gear ratio depicted in FIGURE 1 must be reversed and the fluid passage 110 and 112 connections as shown in FIGURE 5 must be used. Assuming for this structure, that the input rotation is clockwise looking from the external end of the input shaft; FIGURE 3 then shows the direction in which gears 18, 38, and 40 will turn. However, the carriage 30 will now rotate counter-clockwise relative to the input and output shafts 14 and 20. This counterclockwise rotation of the carriage 30 will slide valve 52 and allow fluid pressure $P_1$ to slide valve 54 toward the carriage stem 46, thus communicating fluid pressure $P_1$ through port 66 and fluid passage 112 to exert a force against the end of piston 92. Piston 92 will engage rack 28 and cause gear 26 and output shaft 20 to move in a clockwise direction (as viewed from the input) until the torque required by said input to rotate the output shaft 20, again drops below the predetermined level of the springs 43, at which time the power boost will become inoperative. It is noted that a counter-clockwise input rotation, looking at the input shaft 14, will result in an identical converse action in providing power assist to the output shaft 20.

While the specific details have been herein shown and described, the invention is not confined thereto as other substitutions can be made within the spirit and scope of the invention.

We claim:
1. A power boost mechanism comprising:
a bi-directional rotational input member and an output member responsive thereto,
carriage means pivotally carried by said input and output members including force transmitting means operatively connecting said input and output for transmitting force therebetween,
resilient means operatively connected to said carriage means and imposing a predetermined force thereagainst resisting pivotal motion of said carriage means,
a source of pressurized fluid,
normally inoperative fluid pressure responsive means operatively connected to said output member and said source of pressurized fluid for imposing a force on said output member tending to rotate the same in response to pressurization of said fluid pressure responsive means, and
valve means operatively connected to said carriage means and actuated thereby for controlling fluid flow from said source to said normally inoperative means to energize the latter.
said resilient means being overcome by said carriage means in response to a predetermined force loading of said force transmitting means thereby actuating said valve means to establish fluid flow to said normally inoperative means to pressurize the same,
said normally inoperative means being responsive to said pressurized fluid and operative to actuate said output member thereby providing a power assist to augment the response of said output member to said input member.

2. A power boost mechanism as recited in claim 1, wherein the resilient means comprises:
a first spring interposed between a support and said carriage means for exerting a first predetermined force against said carriage means, and
a second spring interposed between a support and said carriage means for exerting a second predetermined force equivalent to said first predetermined force against said carriage means,
said springs being arranged in a force-opposing relationship,
said first or second spring being overcome by said predetermined force depending upon the relative direction of force transmitted by said force transmitting means.

3. A resilient means as recited in claim 2, wherein said supports are adjustable to vary the predetermined force exerted by said springs.

4. A power boost mechanism as recited in claim 1, wherein the carriage means comprises:
a carriage housing pivotally mounted to the input and output members,
said input member having attached thereto a first gear,
said output member having attached thereto a second gear,
said carriage housing receiving a shaft having as an integral part thereof a third and fourth gear,
said third gear engaging said first gear,
said fourth gear engaging said second gear,
said carriage housing capable of bi-directional movement relative to the input and output axes.

5. A power boost mechanism as recited in claim 4, and further including:
a stem integral with said housing and engageable with said valve means,
fixed stop means against which said stem abuts to limit bi-directional movement of carriage when said carriage means overcomes said predetermined force.

6. A power boost mechanism as recited in claim 5 wherein said fixed stop means includes:
first and second spaced-apart stops against which said stem abuts to limit movement of said carriage in one direction or the other when said resilient means is overcome by said carriage means,
said output member responding to an input force through said carriage means and said housing stop means after said predetermined force of said resilient means is overcome to provide a fail-safe means of operation upon loss of said fluid source.

7. A power boost mechanism as recited in claim 1, wherein the valve comprises:
a cylindrical cavity within said housing having disposed therein two pistons slidingly engaging said cavity,
said fluid source communicating with the ends of said cavity and exerting a force against the ends of said pistons to maintain said pistons in operative engagement with said carriage,
said pistons having lands,
said cavity having a port for each piston land,
said ports venting said pressurized fluid to said fluid pressure operated means,
said servo valve having a null position whereby said ports are vented to a relative low-pressure source thereby rendering the fluid pressure operated means inoperative.

8. A power boost mechanism as recited in claim 1, wherein the fluid pressure responsive means comprises:
a gear rigidly attached to the output,
a rack slidably carried in a fixed support and meshed with said gear,
said fluid pressure responsive means including first and second pistons arranged in axial spaced-apart relationship to operatively engage said rack,
said pistons being carried in first and second chambers having a fluid connection with said controllable fluid pressure and being pressurized thereby depending upon the direction of movement of said servo valve,
said chambers having inner and outer walls,
a spring of predetermined force being disposed between said inner wall of each of said chambers and their associated pistons for imposing a preload thereagainst tending to urge each piston away from the rack,
a fluid source acting against said first and second pistons to urge them away from the rack,
stop means operatively connected to said pistons and engageable with said outer walls of said chambers to limit the movement of the pistons in response to said spring means.

References Cited

UNITED STATES PATENTS

| | | | |
|---|---|---|---|
| 2,396,951 | 3/1946 | Horstmann | 91—381 X |
| 2,403,935 | 7/1946 | Link | 91—381 X |
| 2,931,239 | 4/1960 | Dietrich | 74—388 |

FOREIGN PATENTS 783,150  9/1957  Great Britain.

LEONARD H. GERIN, Primary Examiner

U.S. Cl. X.R.

91—381